(No Model.) 2 Sheets—Sheet 1.
J. L. OWENS.
MILK WAGON.
No. 540,922. Patented June 11, 1895.
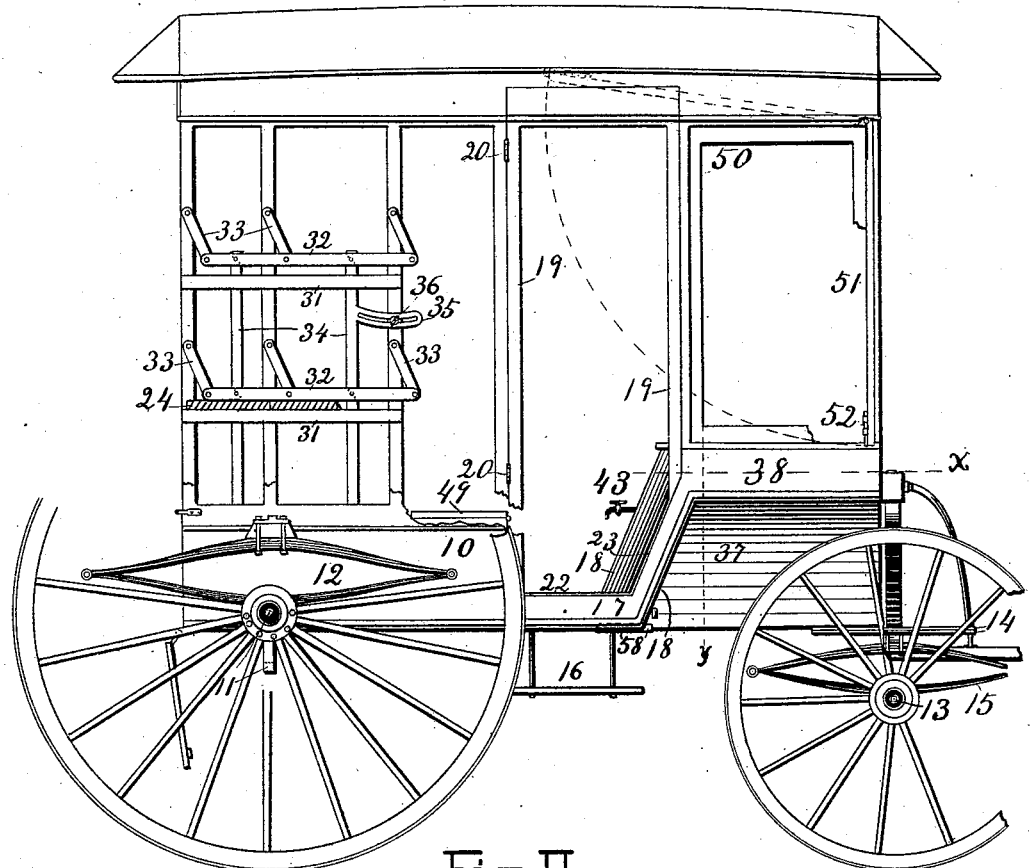
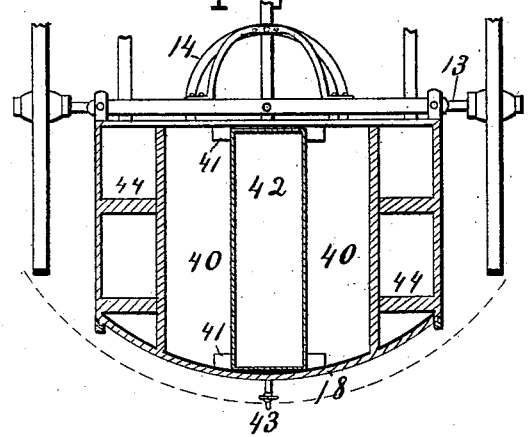
Witnesses:
P. Egbert Stevens
Emma G. Brasheare
Inventor.
John L. Owens.
by W. K. Stevens. Atty.

(No Model.) 2 Sheets—Sheet 2.
J. L. OWENS.
MILK WAGON.
No. 540,922. Patented June 11, 1895.
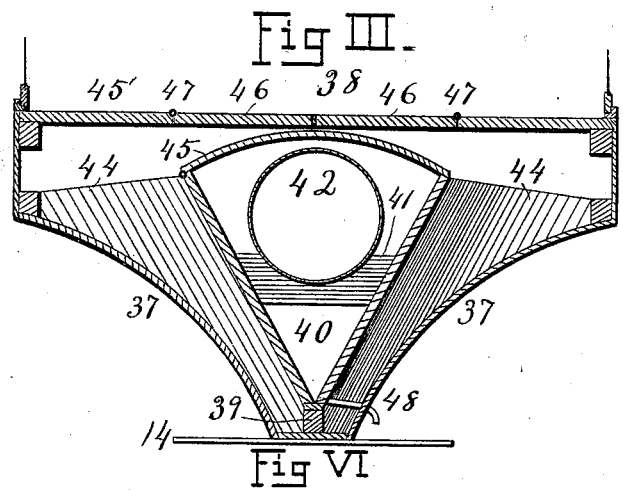
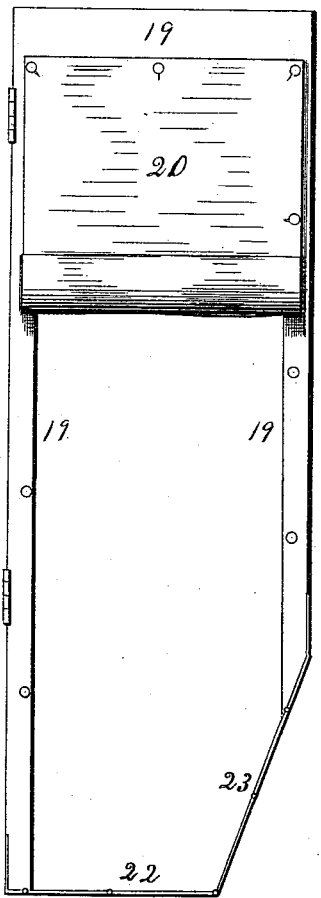
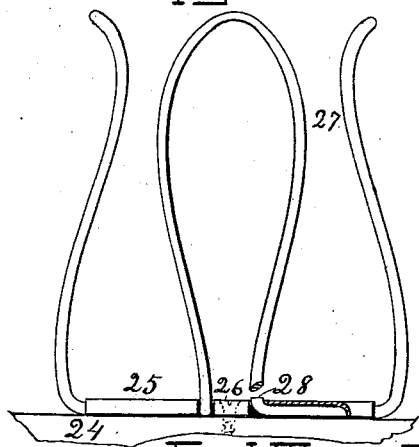
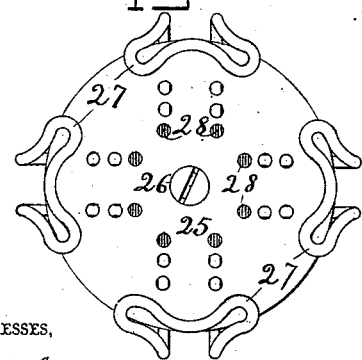
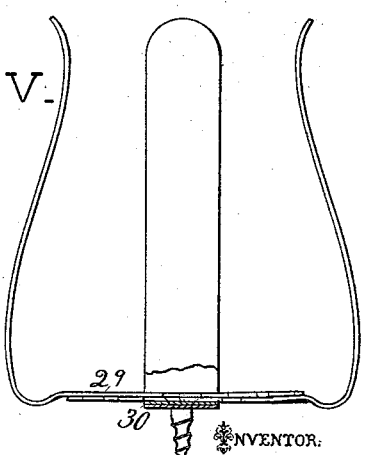
WITNESSES,
P. Egbert Stevens.
Emma G. Brashears.
INVENTOR:
John L. Owens.
by W. C. Stevens, Atty.

UNITED STATES PATENT OFFICE.

JOHN L. OWENS, OF CHARLOTTE, NORTH CAROLINA.

MILK-WAGON.

SPECIFICATION forming part of Letters Patent No. 540,922, dated June 11, 1895.

Application filed October 20, 1894. Serial No. 526,495. (No model.)

*To all whom it may concern:*

Be it known that I, JOHN L. OWENS, a citizen of the United States, residing at Charlotte, in the county of Mecklenburg and State of North Carolina, have invented a new and useful Improvement in Milk-Wagons; and I do hereby declare the following to be a full, clear, and exact description of the same, reference being had to the accompanying drawings, in which—

Figure I is a side elevation of a milk-wagon according to my invention, a portion of the front being broken away. Fig. II represents the forward portion of the wagon in horizontal section, looking down, upon the line $x$ of Fig. I. Fig. III is transverse vertical section at the line $y$ of Fig. I. Figs. IV, V, VI, and VII are detail views of parts of my wagon.

The delivery of milk in small quantities to families satisfactorily to both parties, the dealer and coustomer, involves a great many conditions among which are, first, to deliver the milk as rapidly as possible; second, to churn it as little as possible while in a rapidly moving wagon; third, to keep the milk as cool as possible to prevent its souring; fourth, to carry the bottles with safety against breakage and yet so that they may be taken out with the least delay possible.

To this end my invention consists, first, in means for turning the wagon short so that it may be started away quickly in any desired direction; means for mounting the wagon body as near to the ground as possible to save labor in getting in and out at every stoppage; means for making the wagon body as short as possible and yet allowing every available inch of space for carrying milk and the driver, for obtaining the largest practicable doorway to get in and out at quickly, and for closing the said doorway in stormy weather; second, in means for holding the bottles elastically and separated from one another; third, in means for perfect ventilation around the bottles, for carrying the milk in a reservoir surrounded by ice and for carrying a series of crates filled with bottles so that they shall not jar and rattle, and in some minor details for convenience to the wagon driver as will be hereinafter more fully described and claimed.

The body 10, of the wagon is mounted upon the rear axle 11, by means of springs 12, and upon the forward axle 13, by means of a fifth wheel 14 with springs 15 interposed. The rear axle 11 has a drop bend permitting the body to spring down lower than the level of the rear wheel hub so that the wagon may be readily mounted into by means of a single step 16. The side frame 17 rises forward of the step so high that the forward wheels will swing directly under it to permit the wagon to turn short; and in order that the body may be as short as possible and yet leave room for the driver to get out and in at the sides readily I have made the front board 18 of the drop or main portion of the body, curved backward at the center so that the forward wheels when turned under closely passing the side frame 17, will not touch this front board. With this construction there is barely room at the center of the wagon in front of the seat and behind the said front board for the driver's feet, and yet the curving forward of the front board at the sides permits a wide doorway and plenty of room for the driver to jump in and out. For the doorway I provide a door consisting of a frame 19 hinged at 20 to an upright portion of the body, and a curtain 21 adapted to cover the whole length of the door frame and to be fastened thereto in any usual manner in stormy weather, and to be rolled up entirely out of the way at the top or to be completely removed from the door in pleasant weather, so that, to avoid the necessity of opening the door every time the driver passes out or in, he may go directly through the door frame. To prevent rapid wear of the door frame by the driver's boots in passing out and in I make the lower cross bar 22 and the slanting side portion 23 of metal very light and thin.

Each rack comprises a bottom piece 24 which may be a plain board, or a series of strips fastened together, and upon this bottom piece are secured a series of perforated plates 25, each by means of a central screw 26, as a base piece upon which a bottle is to be set, and I provide each base with a series of springs 27 located around the plate to press against the body of the bottle held thereon whereby the bottles will be kept separated so as not to be broken by rattling against each other, and they will be elastically held so that the milk carried in them will not receive a solid thump when shaken from side to side. These springs are preferably made of wire, with the two ends bent under the plate and projecting upward through it a little at 28. It will be seen that all the springs of one holder are firmly secured in place by means of the single central screw 26, and that if this screw be turned out a little ways and the plate 25 be raised the springs may all be removed and bundled together for close packing and a series of rack bottoms 24 may be piled in a bunch without injury to the springs in case the wagon should be wanted to carry home a load of general merchandise after the milk bottles have been delivered. Each plate 25 has three sets of perforations at different distances from center to receive the projecting ends 28 to adapt the springs to hold large or small bottles by being located transversely far apart or nearer together. The plates 25 may be made of wood grooved on the under side to admit the wire springs, each to any pair of holes, or the plate may be made of tin or other sheet metal flanged downward at its outer edge and the flange cut away to admit the springs. In the modification shown in Fig. V the springs are made of sheet metal such as steel or brass, one of them, No. 29 being curved upward midway for the other one 30 to pass under, and each piece having its two ends bent up to serve as springs.

The racks 24 are to be placed like shelves upon cleats 31 which are permanently secured to uprights at the sides of the wagon body, and I provide a parallel bar 32 hung upon pitmen 33 which in turn are hung upon the said vertical uprights of the body in such a position that they hang almost straight down all slanting one way when the parallel bar rests upon the rack, thereby bracing down the rack tightly upon the cleat. By swinging one of these parallel bars either forward or backward from its hanging position it will rise up away from the cleat, but when it rests upon the rack it can only be swung one way upward and as a matter of convenience I have arranged this way to be forward, and to enable the operator to loosen all the parallel bars of one side at a time. I have connected said bars by means of vertical strips 34. Now by moving any one of the parallel bars the others connected therewith will be given a similar motion, and by means of a slotted segment 35 attached to one of the strips 34 and a binding screw 36 connecting it with one of the body uprights all the parallel bars of one side of the wagon may be secured in any fixed position, either close upon the racks to hold them all down, or raised freely therefrom to permit their removal.

It is very seldom required to turn so short as to bring the shafts square off sidewise and the forward wheel square across under the wagon and I propose to utilize the central portion above the curvature of the forward wheel when turned nearly square across, as a refrigerator. This comprises the curved sides 37, a forward extension 38 of the bottom through which a strong central timber 39 of the body may extend, serving as a firm securing base for the upper member of the fifth wheel 14. The refrigerator further comprises a trough 40 having notched cleats 41 to support a milk can or tank 42 which is made especially for that purpose and provided with a faucet 43 which projects out through the front board 18 into the wagon convenient for the driver to draw cold milk from. Ribs 44 separate the trough 40 from the curved sides 37 forming an air space between these inner and outer walls of the refrigerator.

45 is a curved cover over the milk can to close in the ice that is to be placed at the sides, beneath and on top of the can leaving an air space below the deck 45', which deck covers the whole raised portion of the wagon body, like a floor and serves as the top outer wall of the refrigerator. This deck comprises two lids 46 which part midway and are hinged at 47 to swing outward upon the remaining portion of the deck for the purpose of opening the refrigerator.

48 represents a drain pipe through which the water from melting ice may freely discharge.

In this application there is no invention claimed in the construction of the fifth wheel and the running gear below it, but it is evident that the fullest advantage of the curved front 18 may be obtained if the refrigerator box be left out from between the upper portions of the forward wheels so that the forward wheels could turn completely under the wagon body, and yet as such extremely short turning is seldom desirable I prefer to take advantage of the space between the wheels not generally used in wagons with raised decks for the purposes of the refrigerator as described. A guard 58 may be placed on each side of the refrigerator box to prevent the box being worn by the wheels when the wagon is cramped short.

The driver's seat 49, is hinged at its front edge to swing up forward for ready access to bottles carried under the seat. The forward end and the sides of the fore part are provided with glasses mounted in removable sashes 50. In good weather the sashes may be removed and to leave the front entirely open at such times I hinge the central frame piece 51 at its upper end to the wagon frame and provide it with a bolt 52 whereby it may be secured when down in service or be held up to the top.

Having thus fully described my invention, what I believe to be new, and desire to secure by Letters Patent, is the following:

1. The combination in a wagon of a door frame and a central removable portion; the upper portions of the frame being of wood and the lower cross piece and the lower portion of the front piece being of thin metal; whereby free entrance is obtained level with the floor and flush with the front substantially as described.

2. The combination in a milk wagon of a shelf or rack bottom, a perforated plate, a screw securing the plate upon the rack bottom; and springs projecting upward through the plate and extending outward and upward at the sides thereof as bottle holders, substantially as described.

3. The combination in a milk wagon of a shelf or rack bottom, a plate perforated with holes in pairs located at different distances from center; bottle holding springs to engage the said holes and means for removably securing the plate to the rack bottom, substantially as described.

4. The combination of a wagon body having uprights and cleats secured horizontally thereto; bars located parallel with the cleats and pitmen pivotally hung to the said uprights and to the said bars substantially as described whereby shelves placed upon the cleats and pressed by the bars will be held from bounding and rattling in service.

5. The combination of a wagon body having uprights and cleats secured thereon; pitmen pivotally hung upon the uprights; bars parallel with the cleats hung upon the pitmen, and vertical strips connecting the parallel bars substantially as described whereby all the bars thus connected may be operated by operating one of them.

6. The combination of a wagon body having upright sides and cleats secured thereon; pitmen hung to the said sides; bars hung upon the pitmen parallel with the cleats; connections between the bars uniting them as a frame and means for holding the said frame in any desired position relative to the cleats, substantially as described.

7. The combination in a milk wagon of a deck forward raised above the floor of the main body, forward wheels hung to turn sidewise under the said deck; a tank located beneath the deck and between the upper portions of the wheels, and a double casing surrounding the tank substantially as described whereby a refrigerator for keeping milk cool is located in otherwise waste space in the wagon.

8. The combination in a milk wagon of a floor for the main body; a higher deck forward of that floor; forward wheels hung to turn under the deck; a milk tank located beneath the deck and having a faucet projecting into the open space over the said floor; a casing surrounding the tank at a distance therefrom; and an outer wall at a distance from the casing substantially as described whereby ice may be packed against the said tank and a dead air space be interposed between it and the over air.

9. The combination in a milk wagon of a floor for the main body; a raised deck forward of the floor, wheels hung to turn beneath the said deck and a refrigerator located beneath the deck and between the wheels and having side walls curved nearly parallel to the curve of the wheels when turned under the deck, substantially as described.

10. The combination in a wagon, of a body having a cover frame having sides and top portions to receive window sashes, a vertical portion of the frame hinged at its upper end to the top midway thereof to depend therefrom and provided with a fastener for its lower end, and means at the said lower end and in the top to engage the said fastening substantially as described whereby the midway portion of the frame may be fastened down in service or fastened up out of service.

In testimony whereof I affix my signature in presence of two witnesses.

JOHN L. OWENS.

Witnesses:
MILLARD F. KIRBY,
EDWARD L. BATES.